Figure 1:
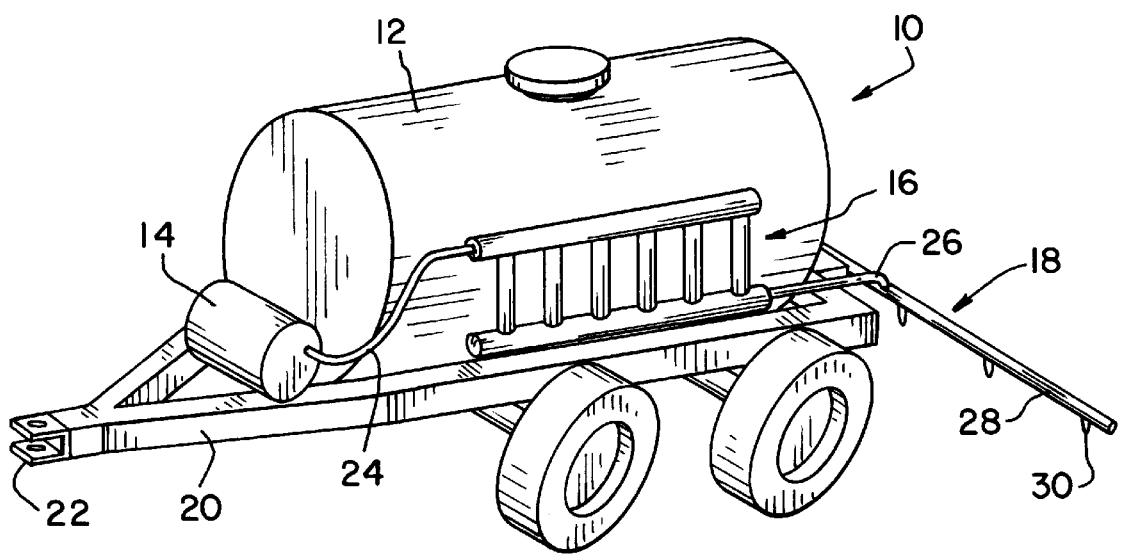

United States Patent [19]
Sanderson

[11] Patent Number: 6,093,287
[45] Date of Patent: Jul. 25, 2000

[54] MAGNETIC TREATMENT OF WATER SUPPLY TO INCREASE ACTIVITY OF CHEMICAL SPRAY SOLUTIONS

[75] Inventor: Charles H. Sanderson, Fort Wayne, Ind.

[73] Assignee: Superior Manufacturing Division, Magnatech Corporation, Fort Wayne, Ind.

[21] Appl. No.: 09/028,174

[22] Filed: Feb. 23, 1998

[51] Int. Cl.[7] .............................. C07C 1/00; B01D 17/06; B01D 11/04; B03C 5/02

[52] U.S. Cl. .................... 204/157.15; 204/554; 204/557; 204/558; 204/660; 366/341

[58] Field of Search ............................ 204/157.15, 554, 204/557, 586, 660; 366/341

[56] References Cited

U.S. PATENT DOCUMENTS

| | | | |
|---|---|---|---|
| 4,714,196 | 12/1987 | McEachern et al. | 239/62 |
| 4,891,600 | 1/1990 | Cox | 328/233 |

FOREIGN PATENT DOCUMENTS

| | | | |
|---|---|---|---|
| 59-189991 | 4/1983 | Japan | C02F 001/48 |
| 63-224793 | 9/1988 | Japan | C02F 001/68 |
| 6322-4793 | 9/1988 | Japan . | |
| 209-6049 | 11/1997 | Russian Federation . | |

*Primary Examiner*—Kathryn Gorgos
*Assistant Examiner*—Edna Wong
*Attorney, Agent, or Firm*—Randall J. Knuth

[57] ABSTRACT

A magnetic processing treatment facility is disclosed for subjecting a fluid flow to magnetic energy. The facility is integrated into agricultural spray apparatus and is effective in increasing the water solubility of chemical agents such as herbicides, pesticides, fertilizer, nutrient liquids and other liquids for agricultural use that are dispersed as a spray solution over an application area. The magnetically treated chemical solution also exhibits enhanced activity in terms of crop growth and pesticide and weed control. The treatment facility utilizes a magnetic core device having a resident permanent magnet for generating a magnetic field that is applied to a fluid volume passing through the device.

28 Claims, 3 Drawing Sheets

MAGNETIC TREATMENT OF WATER SUPPLY TO INCREASE ACTIVITY OF CHEMICAL SPRAY SOLUTIONS

BACKGROUND OF THE INVENTION

1. Field of the Invention

The present invention generally relates to a method and apparatus for increasing the activity and effectiveness of pesticides, herbicides, and other agricultural spray solutions, and, more particularly, to a treatment process that facilitates such increased activity by subjecting the hydrous fluid system to magnetic energy.

2. Description of the Related Art

The agricultural industry employs a variety of chemical treatments designed to eliminate or at least regulate persistent and harmful natural elements such as insect populations and weed growth. Conventional methods have used powerful solutions of pesticides and herbicides in conjunction with nozzle-based spray equipment to distribute the chemical solutions over the affected area. The most aggressive chemical agents are highly effective at even low concentration levels due to their toxic properties. Application of these toxicants are typically conducted in parallel with other treatment measures aimed at promoting crop growth, such as fertilization. It is clear that the management of farming properties requires continuous and effective chemical maintenance to provide sufficient levels of insect and weed control. The benefit of crop protection, however, comes at the expense of introducing a level of toxicity into the farming environment that raises serious problems, such as endangering local habitats of non-targeted organisms, exposing potable water supplies to dangerous contaminants, and releasing hazardous pollutants into the atmosphere. These widespread risks have prompted various governmental agencies to examine the possibility of instituting stricter environmental guidelines that, once implemented, will require modifications to existing discharge limits in the hope of reducing or eliminating contamination of the environment and water supply and minimizing damage to surface-level habitats. The danger to animals is of particular concern because the toxicity levels of the chemical sprays represent a lethal threshold for certain species of wildlife that otherwise are not the targets of the crop treatment procedures and thus do not pose any risk to crop growth. Other regulatory proposals would place restrictions on the chemical content of spray solutions in an attempt to prohibit the use of the most toxic agents.

Commercial spraying operations also face economic problems as a result of treatment costs that fluctuate due to the existence of a variety of uncontrollable and unpredictable environmental factors which adversely affect the toxicity and activity of the chemicals. The lack of predictability means that farmers will incur higher than normal operating expenses as they attempt to respond to problems as they arise, in contrast to more foreseeable conditions where adequate preventive and corrective measures can be readied. Some of the more important factors influencing the degree of chemical activity are water temperature, Ph level, and dilution. Excessive dilution results from the presence of organic and inorganic compounds in the water source, such as the reducing agents $S^2-$, $FE^2+$, $MN^2+$, and $NO^2-$. The difficulty with many of these factors is that their lack of interrelatedness (e.g., not linked by a chain of proximate effects) or dependency on a single common cause prevents the application of one broad treatment method, requiring instead a series of individually different processing techniques. Particular attention is addressed to those factors and conditions occurring naturally or artificially that neutralize the active component of the chemical spray solution.

One current approach to enhancing the effectiveness of agricultural sprayers incorporates an electrostatic process into the hydraulic sprayer. The Melroe Company of Fargo, N.Dak. has proposed a method of contact charging the spray particles prior to nozzle dispersion so that the individual spray cloud droplets acquire a negative charge. The apparatus uses an electrode at the centrifugal pump to apply a 40,000V negative charge to the chemical before it is pumped to the nozzles for distribution. It is proposed that such contact charging allows the spray particles to be propelled towards the coverage area at an increased downward velocity.

However, any possible benefit that may accrue from contact charging will be diminished to the extent of any charge dissipation, circuit disruptions and/or failures, or other electrical conditions that have the effect of appreciably reducing the applied negative charge, which may occur either during the charging cycle or while the charged solution is in transit to the field surface. Additionally, variations in the ionic properties of the field growth, such as an increase in anionic components (i.e., negatively charged ions), will electrostatically oppose the incoming stream of negatively charged spray droplets and act to diminish their surface penetration and impact density. It is clear that contact charging requires an electrostatic environment conducive to the transmission of highly-charged fluid particles and which exhibits minimal vulnerability to electrical interference. However, in view of the many factors affecting spray operations and their effectiveness, it is possible that contact charging may encounter difficulties in guarding against external conditions that modify the charge level. Furthermore, it does not appear that contact charging affects any chemical properties of the spray solution in a manner favorable to improving the amount of chemical agent reaching the field, e.g., as might result from increasing the chemical concentration through elevated water solubility.

The present invention is directed to overcoming the aforementioned problems associated with prior methods of applying fertilizers and pesticides dissolved in chemical spray solutions.

SUMMARY OF THE INVENTION

The present invention overcomes the problems and disadvantages of the prior art by providing a method and system for magnetically treating a chemical solution prior to it being dispersed over an application area.

The invention comprises, in one form thereof, a system for distributing a chemical agent within a target area, comprising containment means for dischargeable storing a fluid volume including the chemical agent; magnetic applicator means, operatively coupled to the containment means, for subjecting a fluid flow discharged from the containment means to magnetic energy; and fluid dispersion means, operatively coupled to the magnetic applicator means, for dispersing the fluid flow subjected to magnetic energy within the target area.

The magnetic applicator means includes a permanent magnet preferably including a plurality of magnetic domains exhibiting alternating polarity.

The invention comprises, in another form thereof, a system for increasing the water solubility of a chemical agent dissolvable in water, wherein the system is operatively associated with a storage means for containing a water volume. The system comprises magnetic force means for generating and applying a magnetic field to at least a partial volume of fluid supplied by the storage means.

The system further comprises fluid delivery means, coupled to the storage means, for supplying the magnetic force means with at least a partial volume of fluid from the water volume. A fluid return means, coupled to the magnetic force means, is provided for conveying to the storage means the at least a partial volume of fluid experiencing the application of the magnetic field.

The invention comprises, in yet another form thereof, a system for treating a volume of water contained within a storage tank and operative as a solvent medium for selected chemical agents, wherein the system is operable to selectively and controllably place into solution the chemical agents. The treatment system comprises fluid retrieval means, in fluid communication with the storage tank, for operatively withdrawing at least a portion of the water volume from the storage tank and generating a fluid flow therefrom; and magnetic means, operatively coupled to the fluid retrieval means, for subjecting the fluid flow to a magnetic field.

The treatment system further comprises fluid dispersion means, operatively coupled to the magnetic means, for dispersably distributing within a target area the fluid flow previously subjected to the magnetic field. The magnetic means includes a permanent magnet generating a magnetic field of alternating polarity.

The invention comprises, in yet another form thereof, a method of distributing a chemical solution including chemical agents dissolved in a water volume. The distribution method comprises the steps of subjecting a fluid flow of the chemical solution to magnetic energy; and dispersing the fluid flow of chemical solution subjected to magnetic energy within an application area.

The step of magnetic energy subjection includes the step of generating a magnetic field of alternating polarity, which further includes the step of providing a permanent magnet operative to create the field of alternating polarity. The chemical agents induce activity favorable to crop growth.

The invention comprises, in yet another form thereof, a method of treating a volume of water operative as a solvent medium for selected chemical agents. The treatment method comprises the steps of acquiring at least a portion of the volume of water and generating a fluid flow therefrom; and applying magnetic energy to the fluid flow.

The step of magnetic energy application includes the step of subjecting the fluid flow to a magnetic field of alternating polarity, which includes the step of providing a permanent magnet operative to generate the magnetic field of alternating polarity. The treatment method further comprises the step of returning the fluid flow experiencing the application of magnetic energy to the water volume. The treatment method further comprises the steps of withdrawing fluid from the water volume to form a treated fluid flow thereof; and dispersing the treated fluid flow within a target area.

One advantage of the present invention is that the water solubility of the chemical agents is increased without varying the requisite volume of water. This effect on water solubility is measurable within a very short period of time following treatment.

Another advantage of the present invention is that the magnetically treated water solution exhibits increased activity as compared to an untreated solution of equivalent volume and chemical concentration.

A further advantage of the present invention is that the magnetic treatment unit requires no active electrical components, power sources, or electrical field quantities, i.e., current flows or voltage levels, making it a self-contained and independently operative system not susceptible to electrical interference or disruption.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 1 is a schematic drawing of a sprayer transport carriage illustrating a representative equipment configuration incorporating the magnetic treatment unit of the present invention;

FIG. 2 is a diagrammatic representation of one embodiment of the present invention;

FIG. 3 is a diagrammatic representation of another embodiment of the present invention;

FIG. 4 is a longitudinal planar section view of a magnetic treatment unit utilized in one form of the present invention;

FIG. 5 is a partial, cut-away planar section view of another form of the present invention utilizing a plurality of individual magnetic treatment units; and FIG. 6 is an axial section view of the array of magnetic treatment units disclosed in FIG. 5, which view is taken along line A–A' and viewed in the direction of the indicated arrows.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

FIG. 1 illustrates a sprayer transport carriage 10 utilized in agricultural applications for providing a volume of chemically-treated water contained in tank 12 and distributing it over a target area such as a crop field. Transport carriage 10 includes a pump 14, a magnetic treatment unit shown representatively at 16, and a spray assembly 18. The entire assembly is transportably mounted on a mobile trailer 20 adapted with a hitch mechanism 22 for detachable coupling to a tractor. The water supply in tank 12 is treated with any of various types of commercial chemical agents known to those skilled in the art, such as pesticides, herbicides, and fertilizers. Pump 14 withdraws a volume of the water solution from tank 12 and generates a controllable fluid flow that is conveyed over inlet fluid line 24 to magnetic treatment unit 16 where it is processed and then transferred via outlet fluid line 26 to spray assembly 18. The water from the fluid flow is distributed throughout conduit rail 28 equipped with an arrangement of spaced-apart nozzles 30 from which fluid is discharged. In particular, the pressurized fluid is dispersed into the air by nozzles 30 to form a fanned-out aerosol particle stream directed substantially towards the ground. As discussed below, the magnetic treatment unit 16 of the present invention subjects the fluid flow to a magnetic field, resulting in increased activity of the chemical agents as measured by weed and pesticide control, and permitting higher water solubility levels for the chemical agents. The arrangement shown in FIG. 1 should not serve as a limitation of the present invention as it should be obvious to those skilled in the art that the entire assembly excepting magnetic treatment unit 16 is formed of conventional components known to those skilled in the art, and therefore may be substituted, modified, or otherwise constructed, in whole or in part, with any comparable equipment of equivalent functionality.

Figure 2:
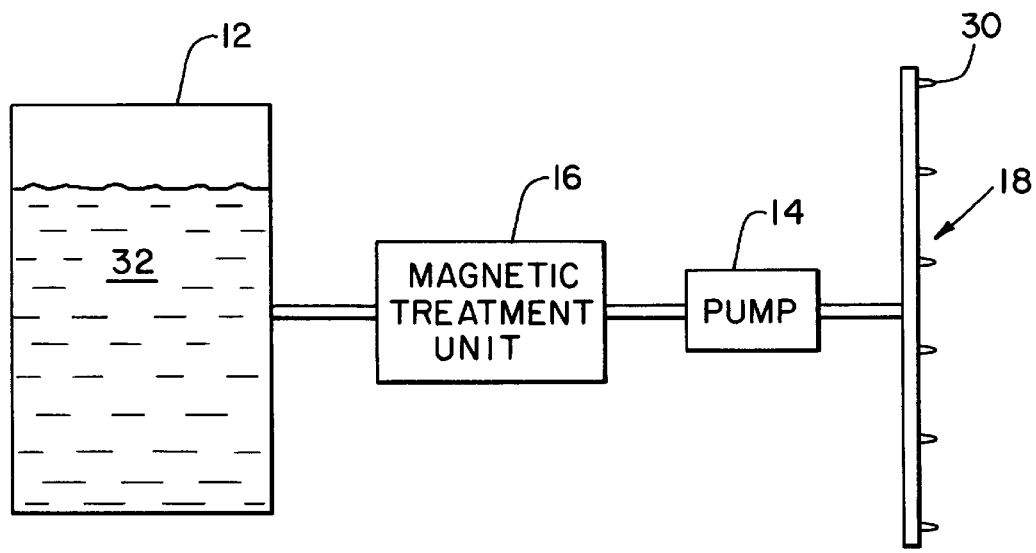
Figure 3:
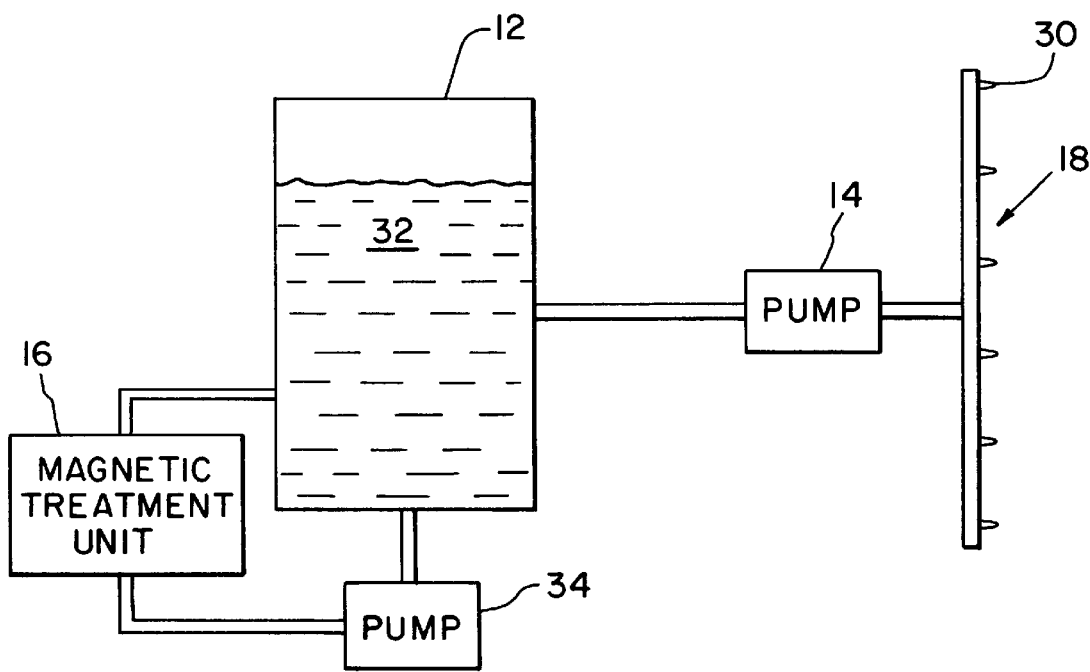

FIGS. 2 and 3 illustrate two different treatment systems according to first and second embodiments of the present invention, respectively, for processing the water supply with a magnetic treatment unit. Each such treatment system can be integrated within the illustrative tank-based implementation of FIG. 1. Referring generally to FIG. 2, the magnetic treatment unit 16 is placed in a serial relationship with respect to tank 12 for serially processing a water volume conveyed from tank 12. The composition of the fluid flow includes chemical agents (e.g., herbicides, fertilizers, and/or pesticides) placed in a water solution. Referring generally to FIG. 3, the magnetic treatment unit 16 is placed in a feedback relationship with respect to tank 12 for processing a partial volume of water retrieved from tank 12 and injecting the processed water back into tank 12. As will become more apparent hereinbelow, application of magnetic energy to the water flow increases the solubility of a variety of chemical agents and enhances the active properties of the chemical spray solution in relation to its ability to effect changes in the target crop area favoring crop growth.

Referring specifically to FIG. 2, a system is shown in accordance with one embodiment of the present invention for treating a volume of water 32 contained in tank 12 and distributing the treated water via spray assembly 18. The system further includes the previously introduced magnetic treatment unit 16 having an inlet port in fluid communication with tank 12 and an outlet port in fluid communication with pump 14. Water volume 32 is chemically prepared as a water solution containing solute agents appropriate for the intended crop maintenance, e.g., pesticidal agents are selected for insect control while herbicidal agents are chosen for weed management. A defined fluid flow is transmitted to magnetic treatment unit 16 over a conventional fluid line. The fluid flow passes through a magnetic core device in the magnetic treatment unit 16 where it is subjected to a magnetic field and then conveyed to pump 14 via another fluid line. The magnetic core device is discussed below in connection with FIGS. 4–6. Pump 14 regulates the flow rate of magnetically-treated solution that is communicated to spray assembly 18, which disperses the fluid via conventional nozzle devices. The location of magnetic treatment unit 16 may be located upstream from pump 14, or alternatively can be located downstream from pump 14, thereby located between pump 14 and spray assembly 18. Further, (although not shown) depending on flow requirements, a plurality of magnetic treatment units may operationally located in fluid connection with spray assembly 18, for example a magnetic treatment unit fluidly connected to each single nozzle 30.

Referring specifically to FIG. 3, a system is shown in accordance with another embodiment of the present invention. As similarly depicted by FIG. 2, the illustrated system treats a volume of water 32 contained in tank 12 and distributes the treated water via spray assembly 18. The system further includes magnetic treatment unit 16 having an inlet port in fluid communication with pump 34 and an outlet port in fluid communication with tank 12. Pump 34 withdraws fluid from tank 12 and controllably generates a fluid flow that is conveyed over a conventional pipe line to magnetic treatment unit 1G. The fluid flow passes through a magnetic core device in the magnetic treatment unit where it is subjected to a magnetic field. The magnetically-treated fluid is then returned to tank 12 where it is placed into mixture with the standing volume of water 32. Pump 34 and magnetic treatment unit 16 define a feedback loop that forms a fluid circulation path allowing a partial volume of water solution to be isolated from tank 12; subjected to magnetic energy; and then added back to fluid volume 32. A controller (not shown) or any other equivalent means may be provided to regulate the intervals and total duration of the magnetic treatment process and the flow rate generated by pump 34. The feedback loop preferably operates in at least two individually selectable modes: in a first mode, the chemical agents are not added to the water supply until the magnetic processing treatment is completed; and, in a second mode, chemical agents may be added prior to, during, and/or after the magnetic processing treatment. The magnetically treated solution is then provided to spray assembly 18 by pump 14.

Both FIGS. 2 and 3 utilize tank-shaped vessels for storing a volumetric quantity of fertilizer, pesticide, and/or herbicide solution. However, the magnetic processing treatment method and apparatus of the present invention operate without regard to the shape of the volume of water available for processing, and consequently are capable of rendering equivalent treatment to fluid volumes appearing in pipes, boilers, containment facilities, any other type of vessel, and even open water. Additionally, the particular upstream-downstream placement of magnetic treatment unit 16 relative to its tandemly associated pump has no bearing on the operation or efficacy of the illustrated systems since these elements can be transposed without affecting the treatment process.

Figure 4:
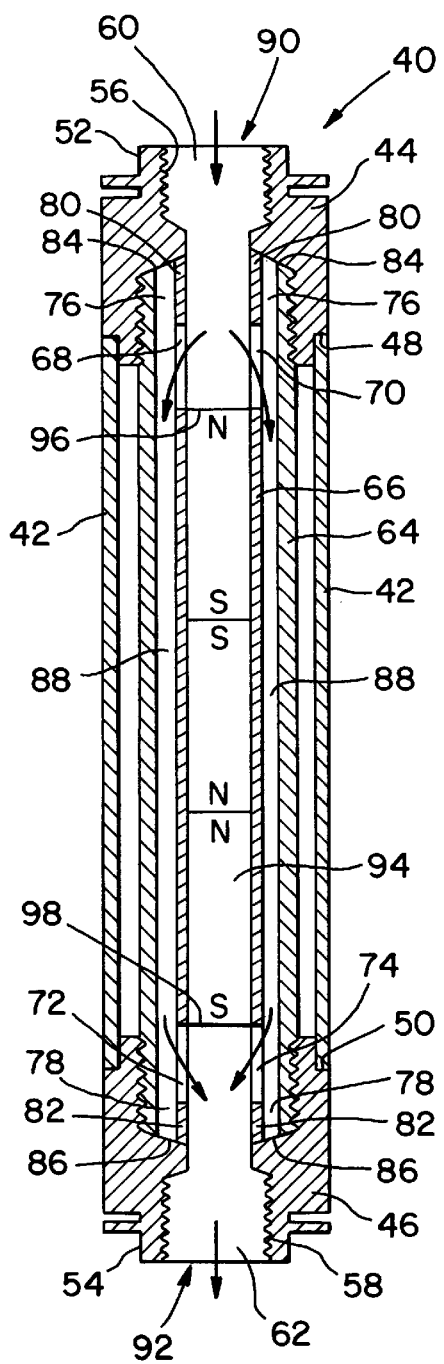

Referring to FIG. 4, a single magnetic core device 40 is shown, illustrating one form of the magnetic core unit 16 of the present invention. For purposes of the instant description, the term "non-magnetic" as used herein refers to materials or substances having a very low magnetic permeability and virtually no ferromagnetic properties, including, but not limited to, materials such as copper, brass, PVC, nylon, and Delrin. The term "magnetic" as used herein refers to materials or substances exhibiting high magnetic permeability, including, but not limited to, materials such as iron and steel.

In the illustrated magnetic core device 40, there is comprised an outer casing structure 42 coupled at terminal sections thereof to a pair of substantially identical fluid fittings 44 and 46. Outer casing 42 and fluid fittings 44 and 46 are preferably formed of a non-magnetic material. Both fluid fittings 44 and 46 are provided with off-sets 48 and 50, respectively, which abut opposite ends of outer casing 42. The fluid fittings 44 and 46 are securely fastened within magnetic core device 40 by threadably engaging fittings 44 and 46 to intermediate casing 64, discussed infra. Such fastening only requires the use of a standard wrench set since fittings 44 and 46 are preferably provided with hexagonal-shaped heads 52 and 54, respectively. Within the body of each fluid fitting 44 and 46 there is preferably defined a respective adaptor region 56 and 58 that is appropriately threaded so as to receive standard pipe nipples (NPT or BSPT) 60 and 62, respectively, wherein each such pipe nipple is suitable for establishing a coupling connection between the magnetic core device 40 and a standard steel pipe or PVC water line.

The magnetic core device 40 further includes a tube-shaped intermediate casing structure 64 that is concentrically and interiorly disposed relative to outer casing 42, and threadably engages fluid fittings 44 and 46 at end sections thereof. The intermediate casing 64 is preferably formed of a ferromagnetic material having a high magnetic permeability (e.g., galvanized iron or steel). The intermediate casing 64 has an outer diameter less than the inner diameter of outer casing 42, and is stably and uniformly spaced therefrom by its threaded attachment to fluid fittings 44 and 46.

A tube-shaped inner casing structure 66 positioned concentrically within intermediate casing 64, and formed of a non-magnetic material (e.g., PVC), is further provided as a component of magnetic core device 40. Inner casing 66 is open at both ends thereof and has two pairs of apertures 68, 70 and 72, 74 formed therein. Apertures 68, 70 are transversely aligned along an axis that is rotatably displaced 90 degrees from the axis along which apertures 72, 74 are aligned. This causes the water which enters one end of magnetic core device 40 to undergo a 90 degree displacement about the longitudinal axis before it exits from the opposite end.

Inner casing 66 is centered within ferrous intermediate casing 64 by means of a pair of rings or sleeves 76 and 78, which are positioned around respective opposite ends 80 and 82 of inner casing 66. Sleeves 76 and 78 are appropriately formed so that, as installed, each sleeve will remain in a state of tight compression between inner casing 66 and intermediate casing 64, enabling casing structures 64 and 66 to remain substantially uniformly spaced-apart over their entire length. The gap region formed by this spaced-apart relationship defines an annular-shaped chamber 88, which is in fluid communication with inlet port 90 and outlet port 92 through respective aperture pairs 68, 70 and 72, 74.

Sleeves 76 and 78 have a relatively high coefficient of elasticity and may be made of nylon, Teflon (polytetraflouroethylene), or any other material that is non-magnetic (i.e., has a very low magnetic permeability), and which has sufficient elasticity to generate the frictional forces required to prevent casing structures 64 and 66 from longitudinally shifting relative to one another. In a preferred form of the invention, sleeves 76 and 78 are made of Delrin, which is an acetal-based resin produced by E.I. du Pont de Nemours & Co. Delrin sleeves of this type are available from Essex Wire Corp. of Columbia City, Ind., among others. As illustrated, sleeves 76 and 78 have chamfered external surfaces 84 and 86, which facilitates their insertion during assembly. The ends 80 and 82 of inner casing 66 may be flared outwardly as shown.

An elongated permanent magnet 94 is further provided in magnetic core device 40 for generating the magnetic energy that interacts with the fluid flow passing through device 40, i.e., within chamber 88. Magnet 94 is slidably and removably disposed within inner casing 66, and, during installation, becomes substantially immovably retained therein. Magnet 94 is preferably formed to have a composition of cobalt, nickel, aluminum, copper and iron, and is magnetized along its longitudinal axis to have a plurality of longitudinally spaced-apart poles (represented by the symbols "N" and "S") of alternating polarity. Magnet 94 is substantially homogeneous in composition, and, in the illustrated embodiment, comprises three magnetic domains (created by the three N-S dipole structures) having their magnetic moments alternately, oppositely aligned, such that dipoles of oppositely-directed magnetic fields are alternately disposed along the length of magnet 94. In particular, the illustrated polarity sequence causes adjacent dipole configurations (i.e., a North-South structure) to generate magnetic fields that are oppositely directed. For example, the upper dipole located proximate inlet 90 creates a magnetic force whose field lines project downwardly in the direction of outlet 92, while the center dipole creates a magnetic force whose field lines extend upwardly in the direction of inlet 90.

A magnetic component such as magnet 94 having the indicated characteristics may be produced by imposing on a bar of magnetic material three (3) longitudinally displaced static magnetic fields of alternating polarity. The number of poles for a particular magnet depends to a great extent on the size of the device and of the flow rate demands, as measured in terms of gallons per hour capacity. Accordingly, in the case of a low capacity device, a magnet having only three dipoles may be the most efficient, although any number of individual dipoles may clearly be used. The illustrated magnetic configuration should not serve as a limitation of the present invention as it should be apparent to those skilled in the art that magnet 94 may be provided by any suitable structure that generates a magnetic field. For example, the magnetic field is not limited to the illustrated magnetic domains of alternating polarity but may include magnetic domains that are ordered so that the field lines extend in a common direction.

Magnet 94 is preferably provided with a pair of resilient plastic end caps 96 and 98 each disposed at a respective end thereof and adapted to be compressably inserted between inner casing 66 and an outer surface of magnet 94, so as to frictionally retain magnet 94 in an immovable placement. End caps 96 and 98 are preferably formed of a non-magnetic material and serve to space magnet 94 from inner casing 66, thereby adding another measure of magnetic insulation.

The fluid flow entering inlet port 90 (as indicated generally by the arrow at mouth section thereof) travels in an axial direction until it reaches the upper end of inner casing 66, where the fluid passes through apertures 68 and 70 into annular chamber 88 (as shown by the arrows). The water flow is guided by chamber 88 to the opposite end of magnetic core device 40, where the fluid passes through apertures 72 and 74 (as shown by the arrows) and emerges from device 40 in the indicated direction via outlet port 92. The motion of fluid through magnetic core device 40 is substantially unimpeded, and follows a substantially linear direction corresponding to the longitudinal dimension of annular chamber 88. In order to achieve optimal magnetic exposure of the fluid flow, it is important that the field density of the magnetic flux produced by magnet 94 be substantially confined within chamber 88.

The structure of magnetic core device 40 is designed based on these requirements to concentrate the magnetic field produced by magnet 94 in the annular chamber 88 immediately adjacent thereto, and, at the same time, to insulate this field from stray energy and other interference emanating from external ferromagnetic objects that may come in contact with or be stationed near magnetic core device 40. Special consideration is given to the formation of inner casing 66 and intermediate casing 64 since they together define the walls of annular chamber 88. In response to the low permeability of inner casing 66 and the ferromagnetic properties of intermediate casing 64, the flux produced by magnet 94 will extend radially outward from the North end of the dipole; pass through inner casing 66; trace a longitudinal pathway along chamber 88; and terminate at the South end of the dipole. This representative field line contour is established without any deleterious straying from chamber 88. By thus containing the magnetic field, maximum effectiveness is achieved in terms of guaranteeing that a substantial amount, if not virtually all, of the generated magnetic flux density is applied to the water flowing through device 40. Containment of the magnetic field is further enhanced through the use of non-magnetic materials for outer casing 42 and fittings 44 and 46 (as described in U.S. Pat. No. 4,299,700 incorporated herein by reference).

Figure 6:
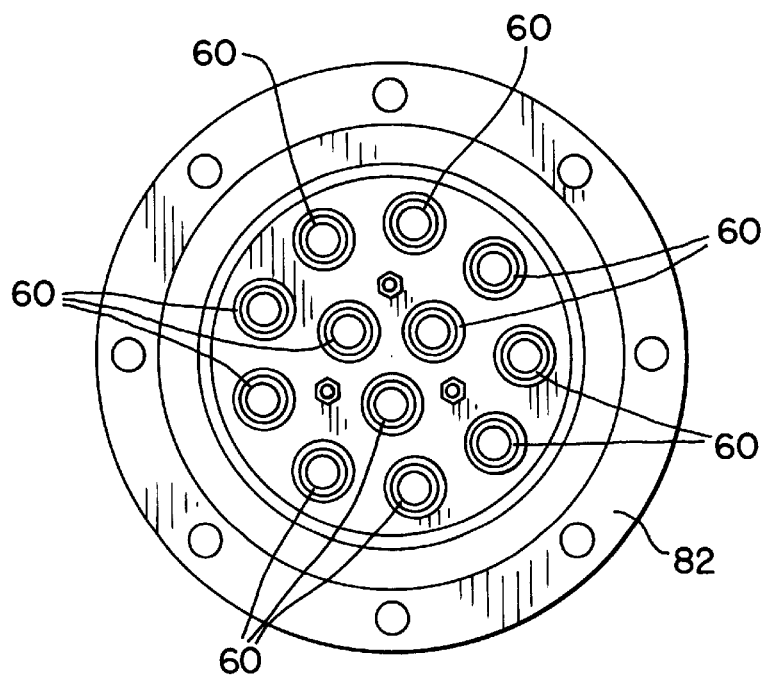
Figure 5:
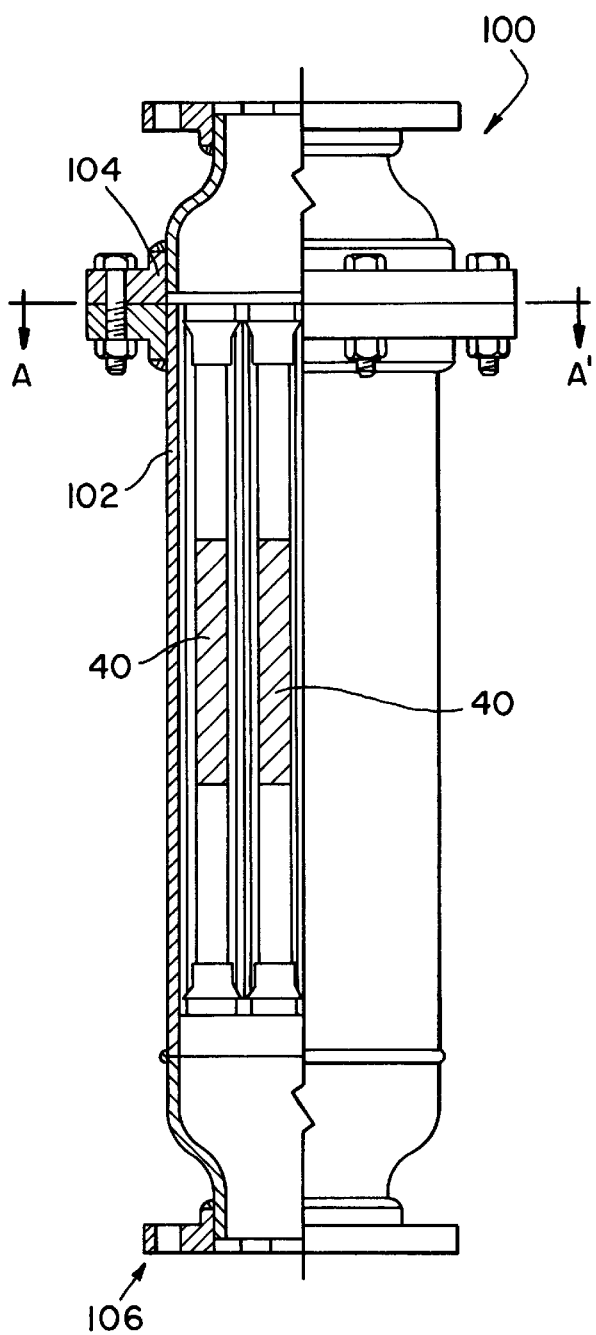

It is possible to increase the capacity of water subjected to an applied magnetic field without changing the structure of the individual magnetic core device 40 by configuring magnetic treatment unit 16 to include a plurality of such devices 40 arrayed together within a shaft body. Referring to FIGS. 5 and 6, there is provided an expanded high-capacity magnetic treatment unit 100 assembled to include an array of twelve (12) individual magnetic core devices 40 enclosed within housing structure 102. Housing structure 102 is suitable for securably holding the device array in a parallel arrangement as fully illustrated in the FIG. 6 section view taken along line A–A' in the direction of the indicated arrows. The partial cut-away section view of FIG. 5 reveals two such magnetic core devices 40 belonging to the array.

A top flange 104 is bolted to housing structure 102 and appropriately connected to a water intake line to ensure that access to the fluid flow is available to each of the magnetic core devices 40. A bottom flange 106 coupled to housing 102 is adapted to collect the water volume emerging from each magnetic core device 40 and to guide the collective flow to a water return line. The total capacity of fluid treatable by the magnetic conditioning process of the present invention is thereby increased by a factor proportional to the number of individual magnetic core devices 40 currently in service. A high capacity operation is therefore possible even with low capacity magnetic core devices. It is clear that any number of magnetic core devices 40 can be used, as it should be apparent that demand for spray volume will dictate the required size of the array. Throughout the drawings it appears that magnetic core device 40 is situated in an upright position. However, the spatial orientation of magnetic core device 40 is not so limited but may encompass any type of placement compatible with the system geometry, which may be tailored to simplicity of design or to meet a particular specification, provided that sufficient pressurization exists to ensure that the fluid flow through magnetic core device 40 is sustained at proper levels.

The structural and operational simplicity of the magnetic treatment unit is but one of the many advantages of the present invention. The essential feature of the magnetic core device 40 is its capacity for generating magnetic energy whose flux pattern can be precisely and accurately confined to a region (i.e., annular chamber 88) through which a fluid flow can travel. The magnetic core device 40 is fundamentally formed of a mechanical construction that provides a housing unit to encase a permanent magnet and establish a fluid passageway through which a water flow can pass while being subjected to the field created by the permanent magnet. The construction is completely devoid of any electrical components or circuits, power sources, or electrical field quantities, i.e., currents and voltages, which clearly distinguishes the present invention over conventional spray systems that employ contact charging or any other comparable means for delivering an electrical charge to the chemical spray solution. Unlike contact charging where the treatment mechanism relies upon circuitry for preparing and delivering a 40,000V charge to the water solution, the treatment methodology disclosed herein modifies the water solution with energy acquired from a permanent magnet whose intrinsic physical properties (i.e., permanent dipole structure) generate the needed magnetic energy, all without the intervention of any external power sources or electrical circuitry. The self-supporting quality of the magnetic core device 40 makes it a highly reliable and durable system, allowing lowered maintenance requirements and replacement costs. The absence of any active electrical components affords the present invention an immunity to RFI emanations and other electrical-based disruptions, unlike contact charging systems whose charging process is susceptible to diminished performance due to emanations from interference sources.

Field tests involving the magnetic treatment unit of the present invention indicate the existence of at least two demonstrably measurable and reproducibly verifiable effects: an increase in the water solubility of the chemical agents and an increase in the level of chemically-induced activity within the application area of the spray solution. These observations were made in a comparative study examining the measurable effects appearing in similarly conditioned farming tracts exposed to both treated and untreated chemical spray solutions.

The solubility of a fluid is a property that is principally dependent upon the ability of the solvent to sever or sufficiently weaken the intermolecular bonds of the solute material and allow the individual solute molecules to dissociate from one another, thereby releasing the solute molecules for random and uniform dispersion within the solution. Water is a widely effective solvent because of the ionic attraction for solute molecules that is derived from the naturally occurring electrically-charged state of the water molecule, as evidenced by a slight positive charge on the two hydrogen atoms and a slight negative charge on the central oxygen atom. The "polar" character of the water molecule creates an electrostatic condition in which sufficient electrostatic force is provided to overcome the intermolecular forces that hold the solute molecules together, including the molecules of chemical agents discussed herein for agricultural spraying operations. It is proposed that the applied magnetic force generated by the magnetic core device of the present invention acts cooperatively with the existing electrostatic force provided by the water molecule to reinforce and elevate the already adequate attraction forces that are operative in dissolving the chemical agents in the water volume. By increasing the attraction energy available in the water volume for dissolving the chemical agents, higher concentrations of solute molecules may be dissociated within the water solution, a result equivalent to increased solubility. Increased quantities of chemical agents may therefore be placed into solution without changing the quantity of water.

It has also been observed that the magnetic processing treatment of the present invention improves the efficacy of the chemical agents as determined, for example, by measuring variations or changes to the pesticide and weed control activity. At the molecular level, one limiting factor that inhibits or diminishes such control activity involves the interaction between the chemical agent and foreign molecules both in the water and at the crop surface, which reduce the ability of the chemical molecule to freely and fully penetrate the crop surface, particularly in no-till situations. For example, the chemically active glyphosate molecule in the representative herbicide Roundup has a negative charge and can thereby become attractively bonded to positively-charged calcium and magnesium molecules commonly present in water. This molecular association limits the chemically-active capacity of the glyphosate molecule. Additionally, in order for the herbicide to work, it must penetrate through a lipid layer of the plant cell, which also has a negative charge. This in turn will operate to repel the herbicide solution.

It is proposed that the magnetic processing treatment of the present invention reduces the intermolecular interactions between the herbicide molecule (negatively charged) and the Ca and Mg molecules (positively charged) present in water. The combined effect of the polar properties of the water molecule and the applied magnetic force (which act cooperatively with one another) may be to produce a temporarily stable intermolecular dipole configuration formed of individual $H_2O$ molecules chained together is to produce an effective interlinked dipole structure whose cumulative electrostatic field is greater than that of an individual water molecule. This collective field may be sufficient to overcome and sustainably oppose whatever attraction may exist between the herbicide molecule and the Ca/Mg molecules, thereby keeping the herbicide component unlinked and free from undesirable molecular associations, or, at the very least, only weakly bonded to the Ca/Mg molecules. The herbicidal agent is now allowed to emerge molecularly intact within the spray solution and is fully available for chemical interactions. It is also proposed that some form of transient but sufficiently stable electron sharing or transfer mechanism may exist wherein the negative charge of the herbicide attaches to or becomes associated with the $H_2O$ molecular structure in such a manner that the negative charge of the herbicide is effectively reduced or removed, thereby presenting the herbicide molecule to the negatively-charged lipid layer as an effective neutral composition. This neutralization may also arise due to a phenomenon whereby the herbicide molecule is induced into acquiring a positive charge, which serves to counteract the existing ionic condition (i.e., negative charge) of the herbicide molecule. The measured increase in activity was observed while herbicidal concentration was held constant for both the treated and untreated water solutions.

The above effects (solubility and increased chemical activity) may be controllable to some degree in the feedback implementation of the magnetic treatment unit since the cyclic processing of the circulating water solution allows a more uniform and diffuse magnetization of the water volume. In this implementation, laminar flow currents are preferably developed in order to stably preserve the inter-linking water molecules that form the dipole chains and hence sustain the magnetically-enhanced properties. Excessive turbulence either during mixing or discharge may disrupt the intermolecular links and diminish the magnetic enhancements.

In sum, the magnetic water conditioning treatment of the present invention is proposed to alter the fluid macrostructure and thereby increase the water solubility of the chemical agents, and to modify the fluid microstructure through expanded dipole formations and other electrostatic effects that enhance the activity of the chemical agents dissolved in the water solution. In general terms, the altered and/or modified water structure is effectively considered a new solvent material, which causes the molecular equilibria of the chemical solution to shift and form a new equilibrium system characterized by its own distinctive molecular architecture and differentiating properties, i.e., solubility level and intermolecular electrostatic relationships.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system for distributing a chemical agent within a target area, comprising:
    containment means for dischargably storing a fluid volume including the chemical agent;
    magnetic applicator means having coaxially aligned dipoles, said magnetic applicator means operatively coupled to said containment means, for subjecting a fluid flow discharged from said containment means to magnetic energy; and
    fluid dispersion means, operatively coupled to said magnetic applicator means, for dispersing said fluid flow subjected to magnetic energy within the target area.

2. The distribution system as recited in claim 1, wherein said magnetic applicator means includes:
    a permanent magnet.

3. The distribution system as recited in claim 2, wherein said permanent magnet includes:
    a plurality of magnetic domains exhibiting alternating polarity.

4. The distribution system as recited in claim 1, wherein said chemical agent exhibits pesticidal activity.

5. The distribution system as recited in claim 1, wherein said chemical agent exhibits herbicidal activity.

6. A system for increasing the water solubility of a chemical agent dissolvable in water, said system being operatively associated with a storage means for containing a water volume, comprising:
    magnetic force means for generating and applying a magnetic field to at least a partial volume of fluid supplied by said storage means, said magnetic field having coaxially aligned dipoles.

7. The system as recited in claim 6, further comprises:
    fluid delivery means, coupled to said storage means, for supplying said magnetic force means with said at least a partial volume of fluid from said water volume; and
    fluid return means, coupled to said magnetic force means, for conveying to said storage means said at least a partial volume of fluid experiencing the application of said magnetic field.

8. The system as recited in claim 7, wherein said fluid delivery means includes:
    a pump.

9. The system as recited in claim 6, wherein said magnetic force means includes:
    a permanent magnet.

10. The system as recited in claim 9, wherein said permanent magnet creates a magnetic field of alternating polarity.

11. The system as recited in claim 6, wherein said chemical agent includes a pesticide.

12. The system as recited in claim 6, wherein said chemical agent includes an herbicide.

13. A system for treating a volume of water contained within a storage tank and operative as a solvent medium for selected chemical agents, said system being operable to selectively and controllably place into solution said chemical agents, comprising:
    fluid retrieval means, in fluid communication with said storage tank, for operatively withdrawing at least a portion of said volume of water from said storage tank and generating a fluid flow therefrom; and
    magnetic means, operatively coupled to said fluid retrieval means, for subjecting said fluid flow to a magnetic field, said magnetic field having coaxially aligned dipoles.

14. The treatment system as recited in claim 13, further comprises:

fluid dispersion means, operatively coupled to said magnetic means, for dispersably distributing within a target area the fluid flow subjected to the magnetic field.

15. The treatment system as recited in claim 14, wherein said fluid dispersion means is effective in generating aerosolizing activity.

16. The treatment system as recited in claim 13, wherein said magnetic means includes:

a permanent magnet.

17. The treatment system as recited in claim 16, wherein said permanent magnet generates a magnetic field of alternating polarity.

18. The treatment system as recited in claim 17, wherein said magnetic field of alternating polarity includes:

a plurality of magnetic domains each having an induced field oriented in opposing relationship to respective induced fields of any adjacent ones of said magnetic domains.

19. The treatment system as recited in claim 13, further comprises:

fluid return means, coupled to said magnetic means, for directing the fluid flow subjected to said magnetic field into said storage tank to form an admixture;

fluid retrieval means, in fluid communication with said storage tank, for operatively pumping a volume of the admixture from said storage tank and forming a fluid flow therefrom; and aerosol means, operatively coupled to said fluid retrieval means, for distributing the pumped fluid flow within a target area using an aerosolizing action.

20. A method of distributing a chemical solution including chemical agents dissolved in a water volume, comprising the steps of:

subjecting a fluid flow of said chemical solution to magnetic energy, said magnetic energy having coaxially aligned dipoles; and dispersing said fluid flow of chemical solution subjected to magnetic energy within an application area.

21. The distribution method as recited in claim 20, wherein said step of magnetic energy subjection includes the step of:

generating a magnetic field of alternating polarity.

22. The distribution method as recited in claim 21, wherein said step of magnetic field generation includes the step of:

providing a permanent magnet operative to create said field of alternating polarity.

23. The distribution method as recited in claim 20, wherein said chemical agents induce activity favorable to crop growth.

24. A method of treating a volume of water operative as a solvent medium for selected chemical agents, comprising the steps of:

acquiring at least a portion of said volume of water and generating a fluid flow therefrom; and applying magnetic energy to said fluid flow, said magnetic energy having coaxially aligned dipoles.

25. The treatment method as recited in claim 24, wherein the step of magnetic energy application includes the step of:

subjecting said fluid flow to a magnetic field of alternating polarity.

26. The treatment method as recited in claim 25, wherein the step of magnetic field subjection includes the step of:

providing a permanent magnet operative to generate said magnetic field of alternating polarity.

27. The treatment method as recited in claim 24, further comprises the steps of:

returning to said volume of water the fluid flow experiencing said application of magnetic energy.

28. The treatment method as recited in claim 27, further comprises the steps of:

withdrawing fluid from said water volume to form a treated fluid flow thereof; and dispersing said treated fluid flow within a target area.

* * * * *